United States Patent [19]

Shintani

[11] Patent Number: 5,602,598

[45] Date of Patent: Feb. 11, 1997

[54] TELEVISION RECEIVER WITH CAPTION DISPLAY

[75] Inventor: Peter Shintani, Tokyo, Japan

[73] Assignee: Sony Corporation, Tokyo, Japan

[21] Appl. No.: 547,965

[22] Filed: Oct. 25, 1995

Related U.S. Application Data

[63] Continuation of Ser. No. 161,103, Dec. 2, 1993, abandoned.

[30] Foreign Application Priority Data

Dec. 2, 1992 [JP] Japan ..................... 4-349901

[51] Int. Cl.[6] .................. H04N 5/445; H04N 5/45
[52] U.S. Cl. ............... 348/565; 348/564; 348/468; 348/706
[58] Field of Search ..................... 348/468, 565, 348/564, 589, 600, 705, 766, 738, 484, 485; H04N 7/87, 7/08, 5/45, 5/445, 7/084

[56] References Cited

U.S. PATENT DOCUMENTS

| | | | |
|---|---|---|---|
| 5,237,418 | 8/1993 | Kaneko | 348/565 |
| 5,294,982 | 3/1994 | Salomon et al. | 348/476 |
| 5,347,365 | 9/1994 | Harigai et al. | 348/525 |

FOREIGN PATENT DOCUMENTS

| | | | |
|---|---|---|---|
| 489387 | 6/1992 | European Pat. Off. | H04N 7/087 |
| 3186085 | 8/1991 | Japan | H04N 7/08 |
| 556369 | 3/1993 | Japan | H04N 5/45 |
| 60465350 | 2/1994 | Japan | H04N 5/45 |
| 8902029 | 3/1990 | Netherlands | H04N 5/450 |

*Primary Examiner*—Michael Lee
*Attorney, Agent, or Firm*—Peter C. Toto; Jerry A. Miller

[57] ABSTRACT

A television receiver selects an audio signal corresponding to one of a plurality of video signals and a caption signal respectively accompanying one of the plurality of video signals. At least one picture and the selected caption are displayed on a screen, the selected sound is output from a speaker. The video, audio and caption may be independently selected.

6 Claims, 4 Drawing Sheets

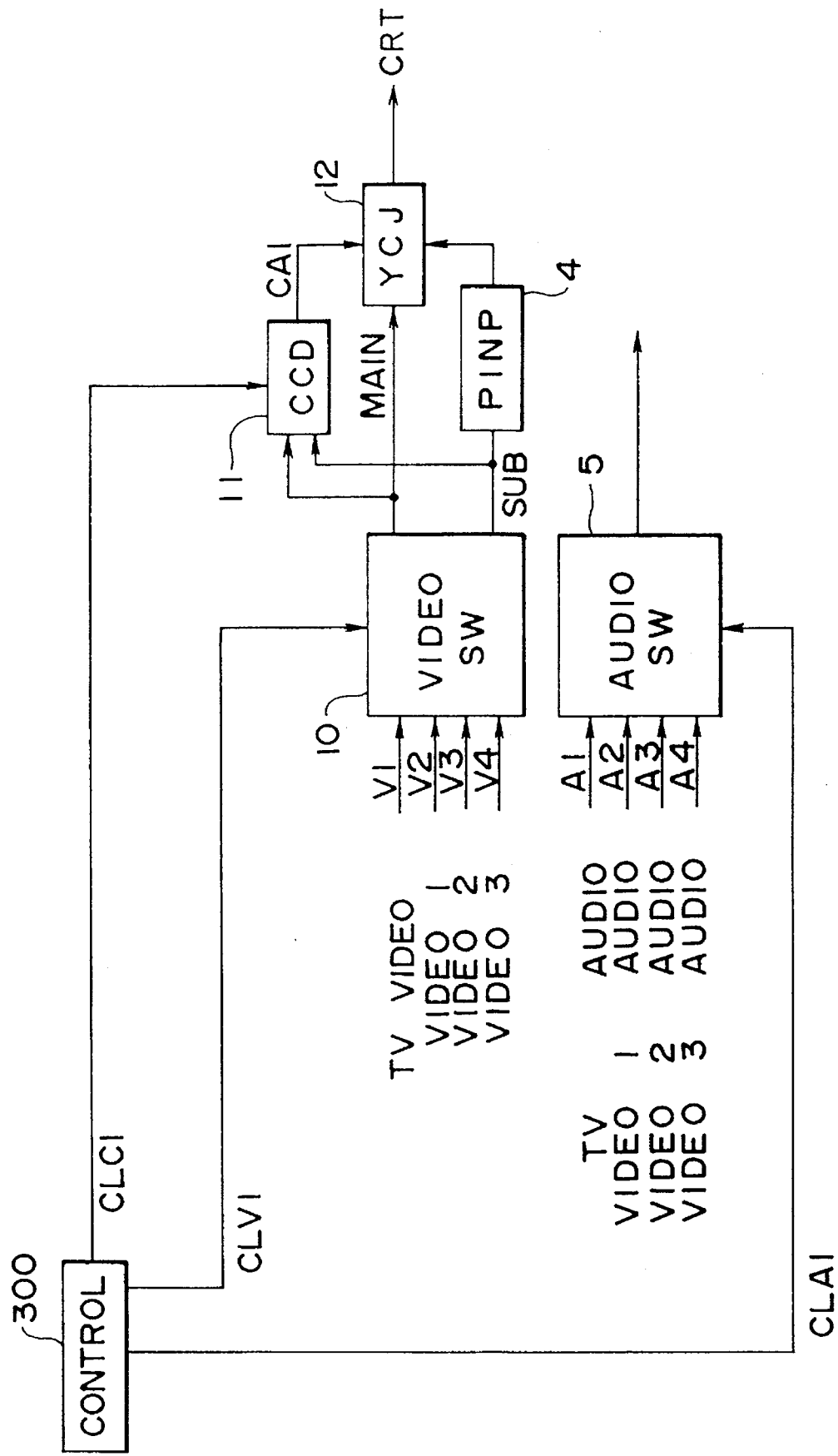

F I G. 2(a)
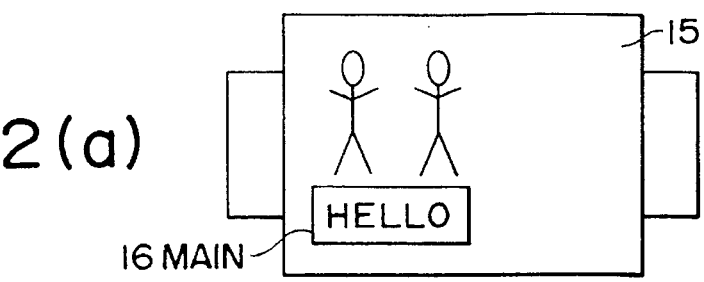
F I G. 2(b)
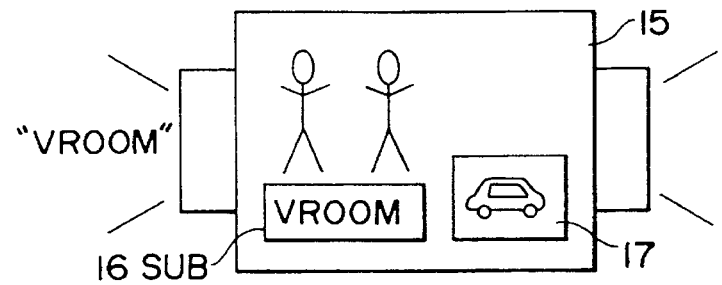
F I G. 2(c)
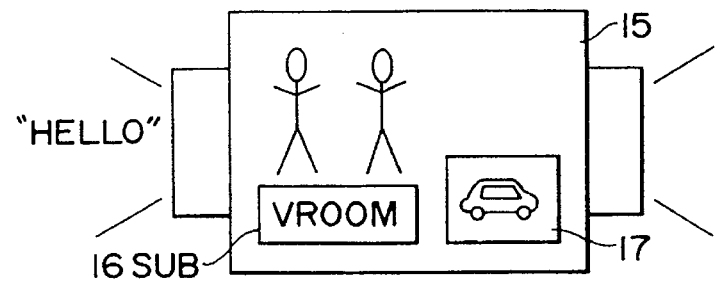
F I G. 3
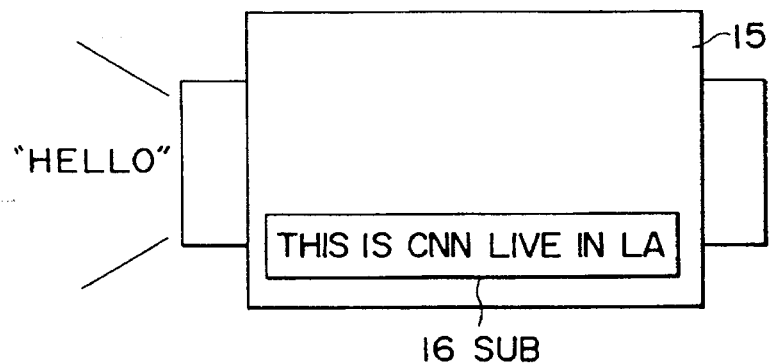

5,602,598

TELEVISION RECEIVER WITH CAPTION DISPLAY

This is a continuation of application Ser. No. 08/161,103 filed on Dec. 2, 1993 which is hereby incorporated by reference, now abandoned.

FIELD OF THE INVENTION

This invention relates to a television receiver with a caption display. More particularly this invention relates to a television receiver with a caption display, which selectively outputs one of the captions and/or one of the audio signals corresponding to multiple pictures simultaneously displayed.

BACKGROUND OF THE INVENTION

Certain television receivers are able to display multiple different pictures on its screen simultaneously. For example, a main picture is displayed on a full screen while at least one (and possibly several) sub-picture selected from another channel or a video system is displayed at a corner of the screen replacing the corner portion of the main picture. The main picture and the sub-picture(s) respectively accompany audio signals and caption signals.

FIG. 5 is a block diagram showing part of a conventional television receiver with a caption display. A video signal V1 from a tuner and multiple video signals V2, V3 and V4 are supplied to a video signal select switch 1. The video signal select switch 1 is controlled by a video control signal CLV from a control circuit 100. A first one of those video signals is selected as a main video signal MAIN by the control signal CLV in the video signal select switch 1. The selected video signal is supplied to a closed caption decoder 2 (referred to as "CCD" hereinafter) and an integrated circuit 3 (referred to as "YCJ" hereinafter) which modulates a video signal and deflects the modulated video signal. A second one of those signals is also selected as a sub-video signal SUB by the video control signal CLV in the video signal select switch 1. The selected video signal SUB is supplied to a picture-in-picture circuit 4 (referred to as "P-IN-P" hereinafter).

The main video signal, the caption signal separated from the main video signal by CCD 2 and the sub-video signal shaped by the P-IN-P 4 are superposed in YCJ 3. The superposed signal is supplied to a CRT (not shown). Therefore the main picture, the caption corresponding to the main picture and the sub-picture are displayed at a certain position on the screen.

An audio signal A1 corresponding to the video signal V1, audio signals A2, A3 and A4 respectively corresponding to the video signals V2, V3 and V4 are supplied to an audio select switch 5. The audio signal select switch 5 is controlled by an audio control signal CLA from a control circuit 200. One of those audio signals is selectively output to a speaker or earphone (not shown).

However the caption signal CA accompanying the main video signal MAIN is only displayed on the screen in the conventional television receiver with a caption display. The caption signal accompanied by the sub-video signal or another video signal is not displayed on the screen. In such a system, the user cannot freely select a picture and a caption as the user pleases.

SUMMARY OF THE INVENTION

One object of this invention is to provide a television receiver in which a caption and a sound are independently selectable as the user pleases.

It is an advantage that the present invention permits the user to monitor video, audio and caption information from different sources as desired.

These and other objects, advantages and features of the invention will become apparent to those skilled in the art upon consideration of the following description of the invention.

According to a first embodiment of this invention, a television receiver selectively outputs one of the audio signals respectively corresponding to multiple video signals. One of the caption signals accompanying one of the video signals is also selected and separated from the corresponding video signal. At least a picture and the separated caption are displayed on a screen.

According to a second embodiment of this invention, a television receiver selectively outputs an audio signal corresponding to a first video signal. A caption signal corresponding to the first video signal is separated from the first video signal. Further a first picture, a second picture and the separated caption are displayed on a screen.

According to a third embodiment of this invention, a television receiver selectively outputs an audio signal corresponding to a second video signal. A caption signal corresponding to a first video signal is separated from the first video signal. Further, a first picture, a second picture and the separated caption are displayed on a screen.

The features of the invention believed to be novel are set forth with particularity in the appended claims. The invention itself however, both as to organization and method of operation, together with further objects and advantages thereof, may be best understood by reference to the following description taken in conjunction with the accompanying drawing.

BRIEF DESCRIPTION OF THE DRAWINGS

FIG. 1 is a block diagram showing an example of this invention.

FIG. 2(a) of FIG. 2 is a view showing a screen display which is controlled by an example of this invention.

FIG. 2(b) of FIG. 2 is a view showing a screen display which is controlled by another example of this invention.

FIG. 2(c) of FIG. 2 is a view showing a screen display which is controlled by another example of this invention.

FIG. 3 is a view showing a screen display which is controlled by another example of this invention.

DETAILED DESCRIPTION OF THE INVENTION

Figure 4:
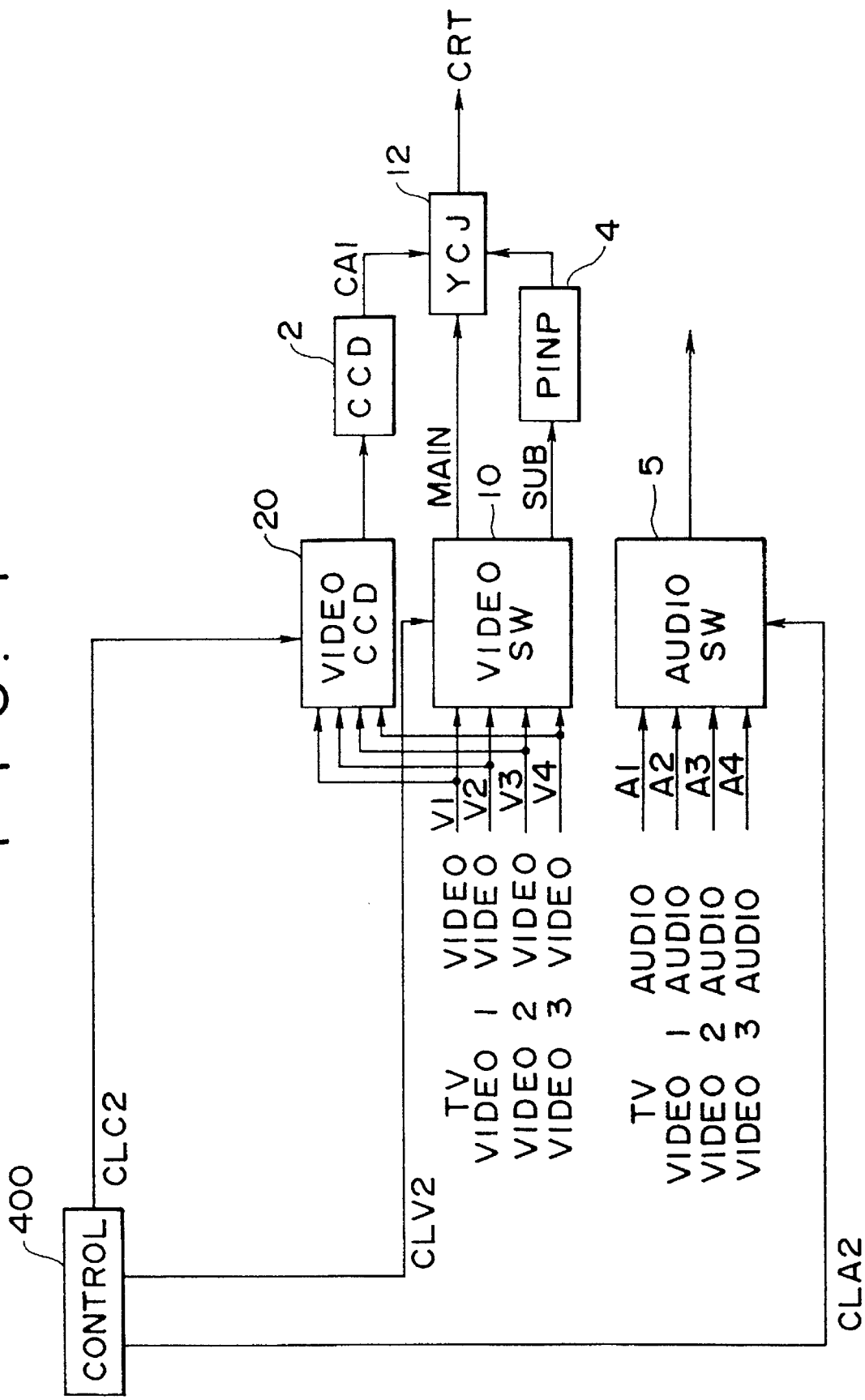
FIG. 4 is a block diagram showing another example of this invention.
Figure 5:
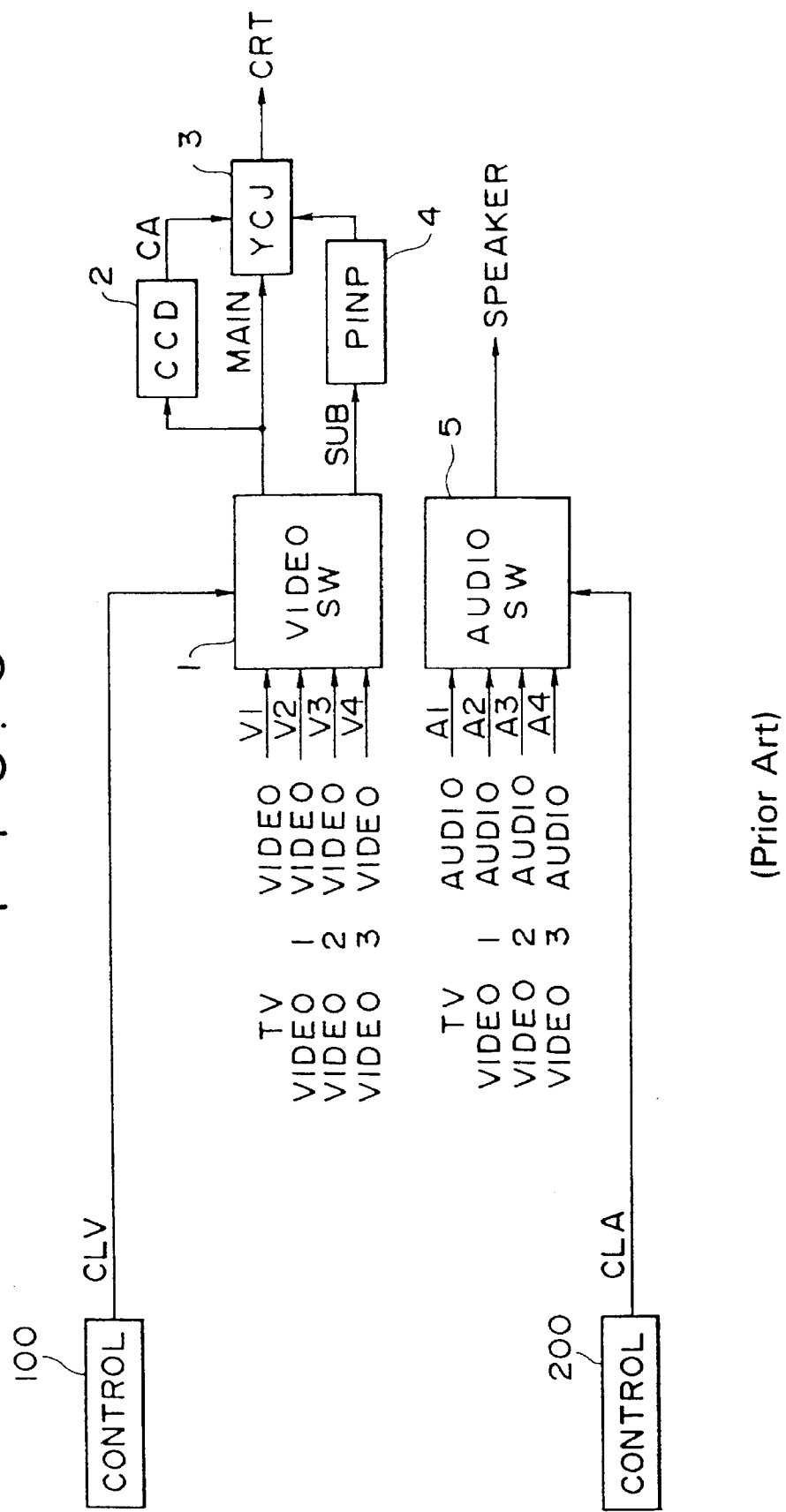
FIG. 5 is a block diagram showing part of a conventional television receiver with a caption display.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawing.

FIG. 1 is a block diagram showing an example of this invention. A control circuit 300 is connected to a video signal select switch 10, an audio signal select switch 5, a closed caption decoder 11 and controls the same. The control circuit 300 may be configured in several ways. In a first example, the control circuit 300 controls the video signal select switch 10, the audio signal select switch 5 and the closed caption decoder 11 independently. In a second example, the control circuit 300 controls the video signal select switch 10 and the audio signal select switch 5 to select the audio signal corresponding to the video signal. The control circuit 300 also controls the closed caption decoder 11 independently. In a third example, the control circuit 300 controls the video signal select switch 10 and the closed caption decoder 11 to select the caption signal corresponding to the video signal. The control circuit 300 also controls the audio select switch 5 independently. In a forth example, the control circuit 300 controls the audio select switch 5 and the closed caption decoder 11 to select the caption signal corresponding to the audio signal. The control circuit 300 also controls the video signal select switch 10 independently.

The video signal select switch 10 is controlled by a video control signal CLV1 from a control circuit 300. A video signal V1 from a tuner and multiple video signals V2, V3 and V4 are supplied to the video signal select switch 10. A first one of those video signals is selected as a main video signal by the video control signal CLV1 in the video signal select switch 10. The selected video signal is supplied to a CCD 11 and a YCJ 12 as a main video signal MAIN. A second one of those signals is also selected as a sub-video signal by the video control signal CLV1 in the video signal select switch 10. The second signal is supplied to the CCD 11 and a P-IN-P 12. The CCD 11 is controlled by a caption control signal CLC1 from the control circuit 300. The CCD 11 separates the caption signal of the main video signal or the sub-video signal from the video signal by the caption control signal CLC1. The separated caption signal is supplied to the YCJ 12 as a caption signal CA1.

The audio signal select switch 5 is controlled by an audio control signal CLA1 from the control circuit 300. One of those audio signals is selected by the audio control signal CLA1 in the audio signal select switch 5.

As a result, when a multi-picture display is not performed, a main picture signal MAIN is only supplied as output to the CRT. A main picture 15 and caption $16_{MAIN}$ accompanied by the main picture (for example, the caption of "HELLO") are displayed as shown in FIG. 2(a). The audio signal A1 corresponding to the main signal is selectively output from a speaker.

There are three basic systems to control the CCD 11 in this invention as follows.

1) A system controlling the CCD 11 and the audio select switch 5 to select the caption signal corresponding to the audio signal.

In this system, the control circuit 300 controls the CCD 11 and the audio select switch 5 to select the caption signal corresponding to the audio signal. This system outputs the caption signal corresponding to the audio signal.

2) A system controlling the CCD 11 independently

In this system, the control circuit 300 independently controls the CCD 11 and the audio select switch 5. This system outputs a caption signal not corresponding to the audio signal.

3) A system controlling a background picture and the CCD 11 independently

In this system, the control circuit 300 controls the video signal select switch 10 and the audio select switch 5 to select the audio signal corresponding to the video signal. This system displays the main picture and outputs the audio signal corresponding to the main picture. It also displays a caption corresponding to a sub-picture not displayed.

In the first system, the caption signal CA1 corresponding to the sub-video signal SUB is separated from the sub-video signal in the CCD 11. The separated caption signal CA1 is supplied to the YCJ 12. The main video signal MAIN, the caption signal CA1 corresponding to the sub-video signal and the sub-video signal SUB are superposed in the YCJ 12. In this case, the main picture 15, the sub-picture 17 and the caption $16_{SUB}$ corresponding to the sub-video signal are displayed at a certain position on the screen as shown in FIG. 2(b). The audio signal (for example A2) corresponding to the sub-video signal SUB is selected in the audio signal select switch 5, and the audio signal is output from a speaker.

In the second system, the caption signal CA1 corresponding to the sub-video signal SUB is separated from the sub-video signal in the CCD 11. The separated caption signal CA1 is supplied to the YCJ 12. The main video signal MAIN, the caption signal CA1 corresponding to the sub-video signal and the sub-video signal SUB are superposed in the YCJ 12. In this case, the main picture 15, the caption $16_{SUB}$ corresponding to the sub-video signal and the sub-picture 17 are displayed at a certain position on the screen as shown in FIG. 2(c). The audio signal (for example A1) corresponding to the main video signal MAIN is selected in the audio signal select switch 5, and the audio signal is output from a speaker.

In the third system, the caption signal CA1 corresponding to the sub-video signal is separated from the sub-video signal in the CCD 11. The separated caption signal CA1 is supplied to the YCJ 12. The main video signal MAIN and the caption signal CA1 corresponding to the sub-video signal SUB are superposed in the YCJ 12. In this case, the main picture 15 and the caption $16_{SUB}$ corresponding to the sub-picture 17 are displayed at a certain position on the screen as shown in FIG. 3. The sub-picture 17 is not displayed. The audio signal A1 corresponding to the main video signal MAIN is selected in the audio signal select switch 5, and the audio signal is output from a speaker.

An application example of this invention is explained while making reference to FIG. 4. A control circuit 400 is connected to a video signal select switch 10, an audio signal select switch 5 and a video closed caption decoder 20 and controls the same. A video signal V1 from a tuner and multiple video signals V2, V3 and V4 are supplied to a video signal select switch 10. Two of those video signals are selectively output as a main video signal and a sub-video signal by the video control signal CLV2 from the control circuit 400 in the video signal select switch 10. The video signal V1, V2, V3 and V4 are also supplied to a video signal closed caption decoder 20 (referred to as "video signal CCD" hereinafter). One of those video signals is selected for a caption by the caption control signal CLC2 in the video CCD 20. The selected video signal is supplied to the CCD 2. The CCD 2 separates the caption signal from the selected video signal. The caption signal CA1 separated by the CCD 2, the main video signal MAIN and the sub-video signal SUB are superposed in the YCJ 12 and output. In this example, a main picture, a sub-picture, a caption and a sound are independently selected as the user pleases. For example, the main video signal is V1, the sub-video signal is V2, the caption signal is separated from the video signal V3 and the audio signal is A4 corresponding to the video signal V4.

This invention has been described with reference to a picture-in-picture feature, but those skill in the art will understand that the invention is equally applicable to a picture-out-picture feature. This invention has disclosed a speaker to produce a sound corresponding to the selected audio signal, but those skill in the art will understand that all apparatus or devices for producing a sound are equally applicable to this invention. Other variations will be evident to those skill in the art.

Thus it is apparent that in accordance with the present invention, an apparatus that fully satisfies the objectives, aims and advantages is set forth above. While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A television receiver, comprising:

a video signal select switch for selecting at least two of a plurality of video signals and outputting said selected signals as a main video signal and a sub-video signal;

an audio signal select switch for selecting one of a plurality of audio signals respectively associated with one of said plurality of video signals, thereby providing a selected audio signal;

a closed caption selector for selecting a closed caption signal associated with at least said sub-video signal, thereby providing a selected caption signal;

a closed caption decoder for decoding said selected caption signal, thereby providing a decoded caption signal;

a control circuit for controlling said video signal select switch, said audio signal select switch and said closed caption selector in response to user entered commands;

a display for simultaneously displaying a main picture represented by said main video signal, a sub-picture represented by said sub-video signal and a caption represented by said decoded caption signal; and means for producing sound corresponding to said selected audio signal.

2. A television receiver according to claim 1, wherein said decoded caption signal and said selected audio signal are associated with a common one of said plurality of video signals.

3. A television receiver according to claim 1, wherein said decoded caption signal and said selected audio signal are associated with different ones of said plurality of video signals.

4. A television receiver according to claim 1, wherein said pictures are displayed in a picture-in-picture arrangement.

5. A television receiver according to claim 1, wherein said pictures are displayed in a picture-out-picture arrangement.

6. A television receiver, comprising:

a video signal select switch for selecting at least two of a plurality of video signals and outputting said selected signals as a main video signal and a sub-video signal;

an audio signal select switch for selecting one of a plurality of audio signals respectively associated with one of said plurality of video signals, thereby providing a selected audio signal;

a closed caption selector for selecting at least a closed caption signal not associated with said main video signal or said sub-video signal, thereby providing a selected caption signal;

a closed caption decoder for decoding said selected caption signal, thereby providing a decoded caption signal;

a control circuit for controlling said video signal select switch, said audio signal select switch and said closed caption selector in response to user entered commands;

a display for simultaneously displaying a main picture represented by said main video signal, a sub-picture represented by said sub-video signal and a caption represented by said decoded caption signal; and means for producing sound corresponding to said selected audio signal.

* * * * *